Patented Dec. 4, 1923.

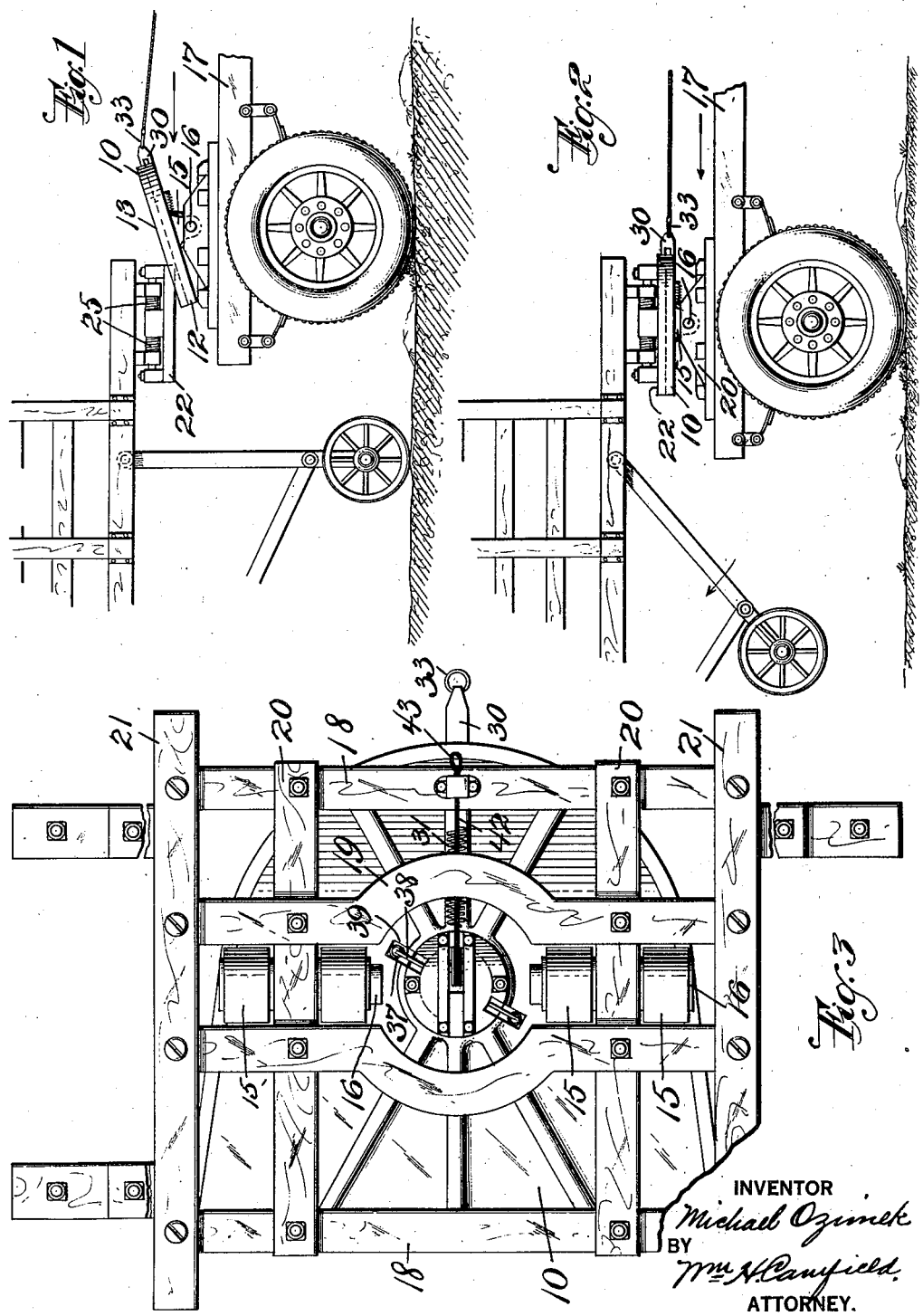

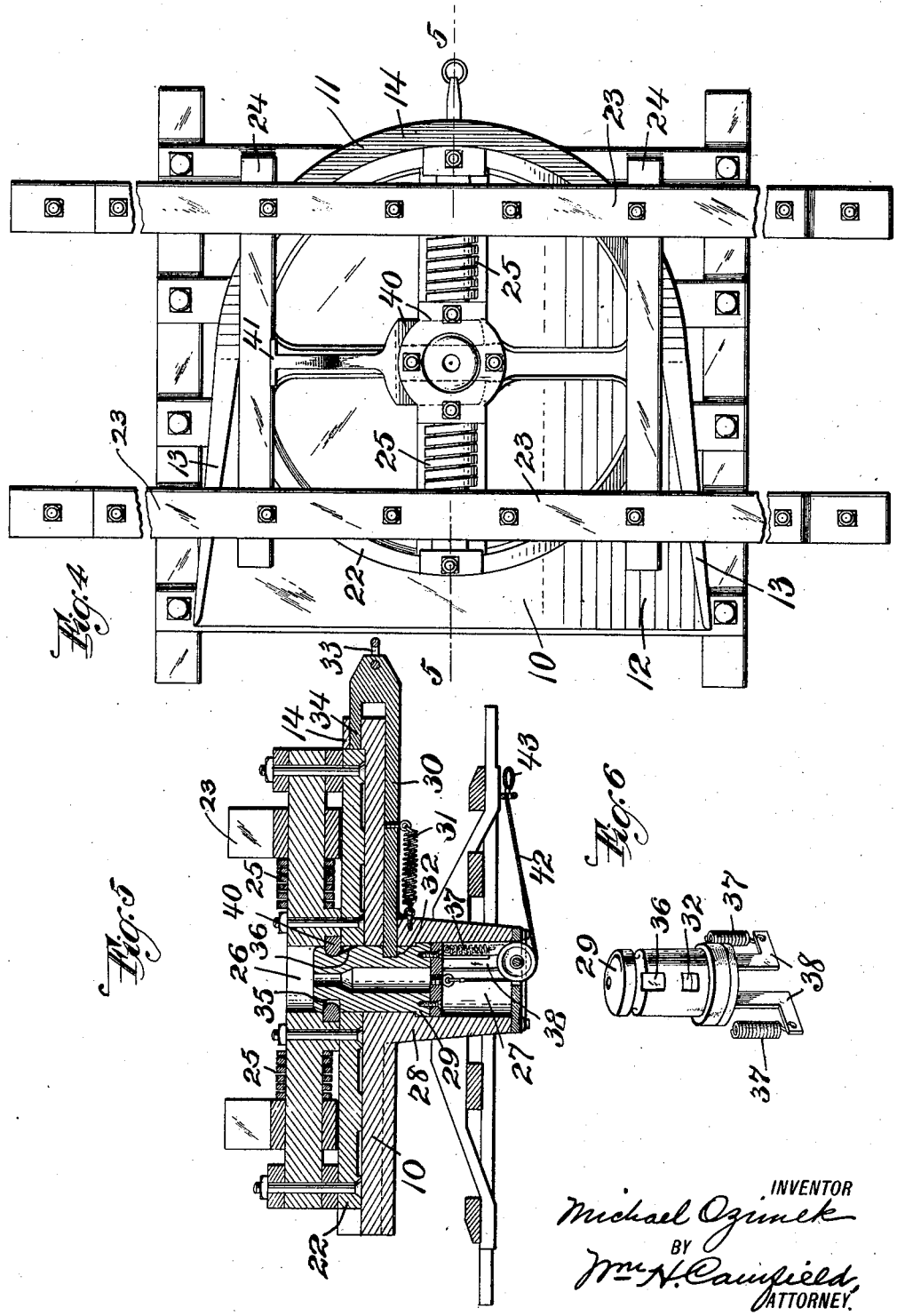

1,475,964

UNITED STATES PATENT OFFICE.

MICHAEL OZIMEK, OF NEWARK, NEW JERSEY.

COUPLING FOR TRACTORS AND TRAILERS.

Application filed June 28, 1922. Serial No. 571,533.

*To all whom it may concern:*

Be it known that I, MICHAEL OZIMEK, a citizen of the United States, and a resident of Newark, county of Essex, and State of New Jersey, have invented certain new and useful Improvements in Couplings for Tractors and Trailers, of which the following is a specification.

This invention relates to an improved coupling or connection which is adapted to be used in connecting two vehicles, and is particularly designed for connecting a truck or tractor with a trailer, and is constructed so that the tractor can be backed against the trailer and the device, which is formed of two parts, one attached to the tractor and the other to the trailer, is automatically assembled or coupled.

The invention is designed to provide a device of this kind in which the king bolt can be manually retracted and held in this position by a suitable latch, which latch is released when the two members of the coupling are pushed together and the king bolt springs into position. This device overcomes the necessity of jacking up the trailer to a point above its normal loading position, and the coupling of the tractor and trailer is very much facilitated.

The invention is illustrated in the accompanying drawings, in which Figure 1 shows the rear end of a tractor and the front end of a trailer as the tractor is backing toward the trailer, and Figure 2 shows the same parts after the tractor and trailer are coupled. Figure 3 is a bottom view of the device. Figure 4 is a top view. Figure 5 is a section on line 5—5 in Figure 4, and Figure 6 is a perspective view of the king bolt.

The coupling is made of two members, one of them being fastened to the tractor and comprising a guide and supporting plate 10 which on its front end is half round, as at 11, and which at its rear end is flared, as at 12, so that its two side flanges 13 converge and form the front flange 14. The plate as so formed has its rear end heavier so that it tilts to the rear, as shown in Figure 1, by reason of the trunnions 15 on each side being mounted on pivotal pins or shafts 16 on the framework which rests on the chassis 17 of the tractor, this framework as shown consisting of the cross bars 18 at the ends and the bars 19 toward the center, these being spread or made substantially circular at their center part to provide access to the king bolt to be hereinafter described, and the longitudinal beams 20 and 21 provide for the further support and attachment of the device, but it will be evident that other forms of frame can be used.

Arranged so as to rotate when it is properly placed on the supporting plate 10 is the bearing plate 22 which is made circular and is adapted to rotate inside the flange 14, and which is secured to the lower face at the front end of the platform of the trailer by a suitable framework, the framework shown comprising cross bars 23 and the end bars 24, and at the center it is provided with draft springs 25 which take up the stopping and starting strain.

The bearing plate 22 has a central opening 26 which, when the parts are assembled, is aligned with the opening 27 in the supporting plate 10, this opening 27 extending down through the extension or boss 28 of the supporting plate 10, these openings being adapted to be fastened together against separation, but can rotate one on the other by means of the king bolt 29 which slides longitudinally, and when it is retracted or withdrawn its top edge is even with or slightly below the top face of the supporting plate 10, but when it is up it enters the opening 26 and thus forms the king bolt of the assembled members. A latch 30, normally pulled in by a yielding means, such as the spring 31, prevents accidental retracting of the king bolt by reason of its being seated in the notch 32 in the bolt and can be pulled out by hand since the free end is provided with a loop 33 or any other suitable means providing for its being grasped, the latch having a finger 34 which slides through an opening in the flange 14 and is engaged by the edge of the plate 22 when the plate is in position.

A recessed part, preferably an annular recess 35, is arranged near the top of the king bolt and is provided with a tapered portion 36 which is engaged by the latch 30 when the king bolt is pulled down, the king bolt being normally held upward by the springs 37 secured at one end to the extensions 38 on the king bolt, and at the other end to the boss 28, these extensions working in slots 39, as will be seen from Figure 3. To provide against accidental movement and to provide for a further locking of the king bolt in its connecting or normal position, I provide a fork 40 which slides in the upper frame and has the handle 41 for its operation. Any suitable means, such as the rope or cable 42, is connected to the bottom of the king bolt and is carried to any convenient point so that its forward end 43 can be used for pulling the king bolt down.

The parts are shown assembled in Figure 5, and when they are to be separated, that is, the trailer is to be removed from the tractor, the handle 41 is pulled up to release the fork 40, and after this is accomplished the latch 30 is pulled out against the influence of the spring 31. This permits the king bolt to be pulled down by pulling on the rope 42, and the end of the latch 30 snaps into the recessed part 35 at the top edge of the tapered face 36 and is thus held below the top face of the plate 10, and the parts can slide apart, that is, the bearing plate 22 can slide backward from the guide and supporting plate 10, and the parts are left in this position until they are to be again assembled. Then the tractor is backed up against the trailer and the downwardly and rearwardly inclined plates 10 rides underneath the bearing plate 22, as shown in Figure 1, and as this continues it raises the trailer, if it is slightly below the level that it is adapted to ride at, until the plate 22 hits the part 34 of the latch 30. This causes the inner end of the latch 30 to move far enough ahead to just clear the top edge of the tapered face 36 and the springs 37 snap the king bolt up into place, as shown in Figure 5, and then if any additional precaution is needed, in case of heavy loads, the fork 40 is pushed in and it binds the king bolt in position as it engages two sides of the annular recess 35, as will be clearly seen from Figures 4 and 5.

The fork 40, which acts as a supplemental lock, is used where long hauls are made or where an extremely heavy load is being transported on the trailer, being simply an additional precaution against vibration or rough roads making it at all possible for the king bolt to be retreated even if the latch 30 were temporarily disengaged from the king bolt. In normal operation the latch 30 will be sufficient, and this latch and also the rope or cable 42 can be operated by suitable levers or pedals with proper holding devices, not shown, which can be manipulated to operate the primary latch 30 and the king bolt in their proper sequence.

It will be understood that modifications may be made in the construction and arrangement of the parts without departing from the scope of the invention.

I claim:

1. A coupling comprising two members slidable one on the other, a king bolt in one member and adapted to be projected into the other and act as a central pivot, and a latch to hold the king bolt retracted and disposed so that the latch releases the bolt when said other member is in position, said latch being also disposed so that it can hold the king bolt retracted after the members are assembled.

2. A coupling comprising two members slidable one on top of the other, and a king bolt in one member and slidable into the other to act as a central pivot when the members are in relative positions, and a latch adapted to hold said king bolt in retracted position after the members are assembled and also to be automatically released when the members are being assembled.

3. A coupling comprising two members, one of said members having a rocking plate normally tilted, the other member being slidable on the tilted plate to a concentric position, and a king bolt in one member and released by the other to enter said other member to form a pivot therefor.

4. A coupling comprising two members, one of said members having a rocking plate normally tilted, the other member being slidable on the tilted plate to a concentric position, a spring-operated king bolt in one member, means for holding the king bolt in retracted position, and a latch operated by the other member when in position to release the king bolt, which bolt, when so released, acts as a central pivot for the members.

5. A coupling comprising a supporting plate pivoted so as to rock and having a divergent end, the supporting plate having a marginal flange on its narrow end and on its sides, a bearing plate having means for fastening it to a vehicle and being adapted to slide up and onto the supporting plate, a spring-operated king bolt in the supporting plate to act as a central pivot, a latch to engage the king bolt to hold it in retracted position against the influence of the spring, said latch having a finger to be engaged by the bearing plate when the bearing plate is in its normal position, means on the latch for operating it manually, and means on the king bolt for manually returning it to its retracted position.

6. A coupling comprising a supporting plate pivoted so as to rock and having a divergent end, the supporting plate having a marginal flange on its narrow end and on its sides, a bearing plate having means for fastening it to a vehicle and being adapted to slide up and onto the supporting plate, a spring-operated king bolt in the supporting plate, a latch to engage the king bolt to hold it in retracted position against the influence of the spring, said latch having a finger to be engaged by the bearing plate when the bearing plate is in its normal position, the king bolt having an annular groove near its top end, a key slidable on the bearing plate and adapted to enter the groove to lock the king bolt, the part of said groove in line with the latch having a tapered portion with a shoulder on its top end to receive the end of the latch, means on the end of the latch for manually withdrawing it, and means on the king bolt for manually pulling it to its retracted position.

In testimony that I claim the foregoing, I have hereto set my hand, this 21st day of June, 1922.

MICHAEL OZIMEK.